United States Patent
Hsieh et al.

(10) Patent No.: US 12,476,349 B2
(45) Date of Patent: Nov. 18, 2025

(54) WIRELESS COMMUNICATION DEVICE

(71) Applicant: MEDIATEK INC., Hsinchu (TW)

(72) Inventors: Shih-Wei Hsieh, Hsinchu (TW);
Wei-Hsuan Chang, Hsinchu (TW);
Chih-Wei Lee, Hsinchu (TW);
Shyh-Tirng Fang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 333 days.

(21) Appl. No.: 18/344,136

(22) Filed: Jun. 29, 2023

(65) Prior Publication Data

US 2025/0007147 A1    Jan. 2, 2025

(51) Int. Cl.
*H01Q 1/00*      (2006.01)
*H01Q 1/24*      (2006.01)
*H01Q 1/52*      (2006.01)
*H04M 1/02*      (2006.01)

(52) U.S. Cl.
CPC ............. *H01Q 1/243* (2013.01); *H01Q 1/526* (2013.01); *H04M 1/026* (2013.01)

(58) Field of Classification Search
CPC .......... H01Q 1/243; H01Q 1/36; H01Q 1/241; H01Q 1/38; H01Q 1/42; H01Q 1/526; H04M 1/026
USPC ...................................................... 455/575.7
See application file for complete search history.

(56) References Cited

U.S. PATENT DOCUMENTS

| | | | |
|---|---|---|---|
| 2021/0167487 A1* | 6/2021 | Varma | H01Q 25/005 |
| 2022/0217656 A1* | 7/2022 | Malik | H04B 7/06952 |
| 2022/0303368 A1* | 9/2022 | Lee | H04M 1/185 |

OTHER PUBLICATIONS

IP.com search History (Year: 2025).*

* cited by examiner

*Primary Examiner* — Moustapha Diaby
(74) *Attorney, Agent, or Firm* — McClure, Qualey & Rodack, LLP

(57) ABSTRACT

A wireless communication device is provided. The wireless communication device includes a circuit board, an antenna module, a housing and a metal pattern unit. The antenna module is coupled to the circuit board, wherein the antenna module transmits a wireless signal, the antenna module defines a first FOV area and a second FOV area, and the first FOV area differs from the second FOV area. The housing covers the antenna module, wherein a lid portion of the housing corresponds to the first FOV area, and the lid portion has a first equivalent dielectric constant. The metal pattern unit corresponds to the second FOV area, the metal pattern unit causes a second equivalent dielectric constant, and the first equivalent dielectric constant differs from the second equivalent dielectric constant.

21 Claims, 11 Drawing Sheets

WIRELESS COMMUNICATION DEVICE

BACKGROUND OF THE INVENTION

Field of the Invention

The present invention relates to a wireless communication device, and, in particular, to a wireless communication device with an antenna module.

Description of the Related Art

The wireless communication devices such as mobile phones are popular. Technological developments have allowed mmWave transmission technology to be utilized in wireless communication devices. The 5G mmWave transmission technology has many advantages, such as its high bandwidth, large capacity, and ultra-low latency, and it can achieve a larger available bandwidth and higher transmission rates. However, the mmWave signal of the antenna module is usually blocked by the screen of the wireless communication device, and the signal transmission on the screen side of the wireless communication device is thus impacted.

BRIEF SUMMARY OF THE INVENTION

An embodiment of the present invention provides a wireless communication device. The wireless communication device includes a circuit board, an antenna module, a housing and a metal pattern unit. The antenna module is coupled to the circuit board, wherein the antenna module transmits a wireless signal, the antenna module defines a first FOV area and a second FOV area, and the first FOV area differs from the second FOV area. The housing covers the antenna module, wherein a lid portion of the housing corresponds to the first FOV area, and the lid portion has a first equivalent dielectric constant. The metal pattern unit corresponds to the second FOV area, the metal pattern unit causes a second equivalent dielectric constant, and the first equivalent dielectric constant differs from the second equivalent dielectric constant.

In one embodiment, the metal pattern unit comprises a plurality of metal strip patterns.

In one embodiment, the metal pattern unit comprises a plurality of metal strip rectangles, the wireless signal has a wavelength $\lambda$, and the length of each of the metal strip rectangle is less than $$\frac{\lambda}{2}.$$

In one embodiment, the metal pattern unit comprises a plurality of metal strip circles, the wireless signal has a wavelength $\lambda$, and the diameter of each of the metal strip circle is less than $$\frac{\lambda}{2}.$$

In one embodiment, the metal strip patterns are arranged in a matrix.

In one embodiment, the metal pattern unit is disposed on the inner surface of the housing.

In one embodiment, the wireless communication device further comprises an electromagnetic shielding part. The antenna module is disposed on the first surface of the circuit board. The electromagnetic shielding part corresponds to the second surface of the circuit board. The first surface is opposite to the second surface. The antenna module faces the lateral direction of the wireless communication device.

In one embodiment, the lid portion is located between the metal pattern unit and the electromagnetic shielding part, and the first equivalent dielectric constant is greater than the second equivalent dielectric constant.

In one embodiment, the metal pattern unit is located between the lid portion and the electromagnetic shielding part, and the second equivalent dielectric constant is greater than the first equivalent dielectric constant.

In one embodiment, the wireless communication device further comprises a screen, wherein the antenna module is disposed on the first surface of the circuit board, the screen corresponds to the second surface of the circuit board, the first surface is opposite to the second surface, and the antenna module faces the lateral direction of the wireless communication device.

In one embodiment, the wireless communication device further comprises a substrate, wherein the substrate is disposed between the antenna module and the housing, and the metal pattern unit is disposed on the substrate.

In another embodiment, a wireless communication device is provided. The wireless communication device includes a circuit board, an antenna module and a housing. The antenna module transmits a wireless signal, the antenna module defines a first FOV area and a second FOV area, and the first FOV area differs from the second FOV area. The housing covers the antenna module, wherein the first lid portion of the housing corresponds to the first FOV area, a second lid portion of the housing corresponds to the second FOV area, the first lid portion has a first equivalent dielectric constant, the second lid portion has a second equivalent dielectric constant, and the first equivalent dielectric constant differs from the second equivalent dielectric constant.

In one embodiment, the first lid portion is located between the second lid portion and the electromagnetic shielding part, and the first equivalent dielectric constant is greater than the second equivalent dielectric constant.

In one embodiment, the first lid portion comprises a metal pattern unit, and the second lid portion has no metal pattern unit.

In one embodiment, the second lid portion comprises a metal pattern unit, and the first lid portion has no metal pattern unit.

In one embodiment, the first lid portion comprises a first metal pattern unit, and the second lid portion comprises a second metal pattern unit.

In one embodiment, the first metal pattern unit comprises a plurality of first metal strip rectangles, the second metal pattern unit comprises a plurality of second metal strip rectangles, and the length of each of the first metal strip rectangles differs from the length of each of the second metal strip rectangles.

In one embodiment, the first lid portion and the second lid portion are curved.

In another embodiment, a wireless communication device is provided. The wireless communication device includes a circuit board, an antenna module, a housing and a metal pattern unit. The antenna module is coupled to the circuit board, wherein the antenna module transmits a wireless signal, the antenna module defines a FOV area. The housing covers the antenna module. The metal pattern unit is disposed on the housing, wherein the metal pattern unit corresponds to the FOV area and an equivalent dielectric constant of the housing is decreased by the metal pattern unit.

In one embodiment, the antenna module faces a direction that is perpendicular to the circuit board. The metal pattern unit comprises a plurality of metal strip rectangles. The wireless signal has a wavelength λ. The length of each of the metal strip rectangles is less than $$\frac{\lambda}{2}.$$

In the embodiments of the invention, the spherical coverage of the wireless signal of the antenna module is deflected toward the area with higher equivalent dielectric constant. Therefore, the metal pattern unit of the embodiment of the invention compensates the influence of the electromagnetic shielding part (screen) and improves the signal transmission of the wireless communication device. However, the disclosure is not meant to restrict the invention. The metal pattern unit can also be utilized in other ways. For example, in one embodiment, the metal pattern unit is simply utilized to decrease the equivalent dielectric constant of the housing.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1A:
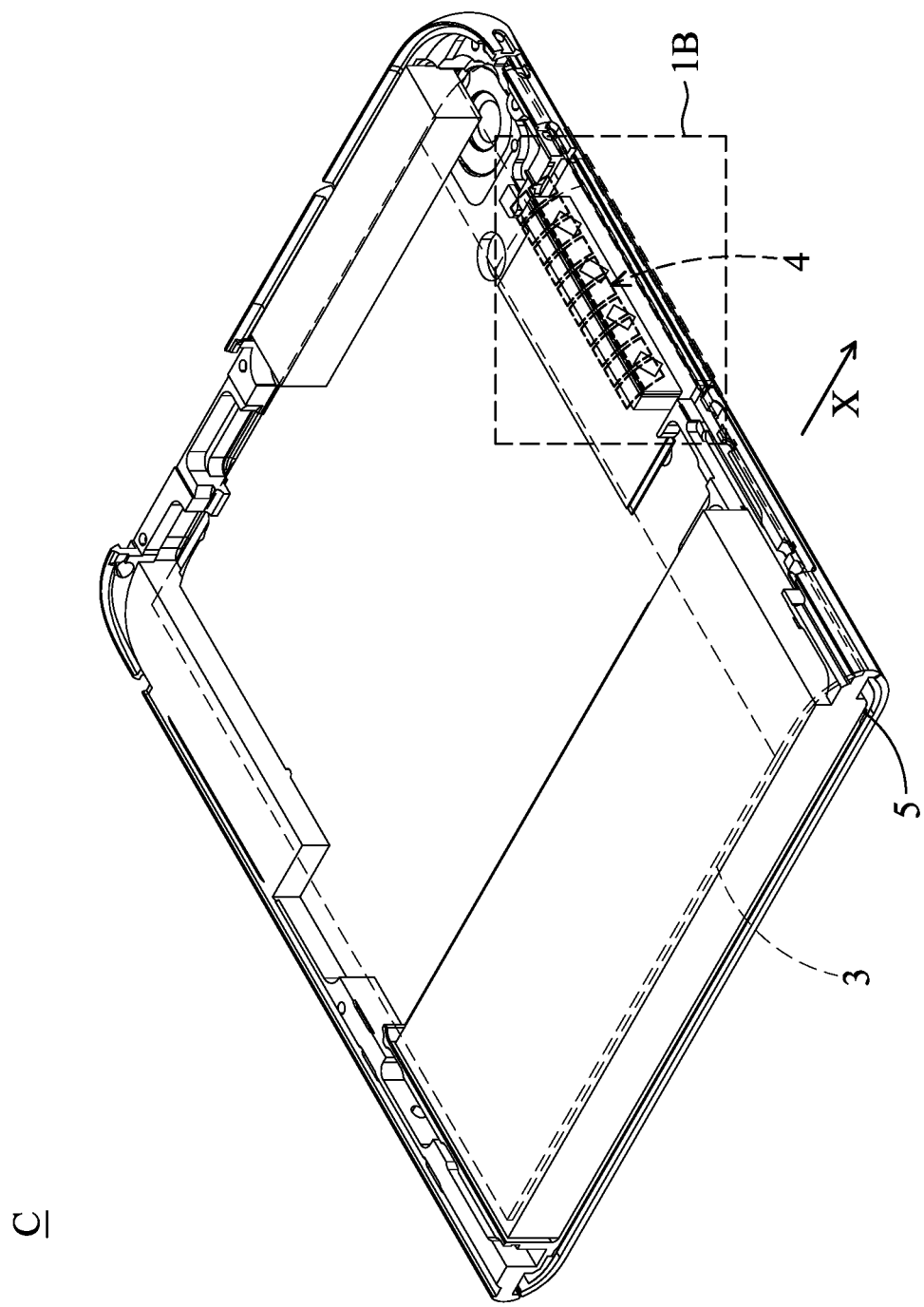
FIG. 1A is a perspective view of a portion of a wireless communication device of a first embodiment of the invention.
Figure 1B:
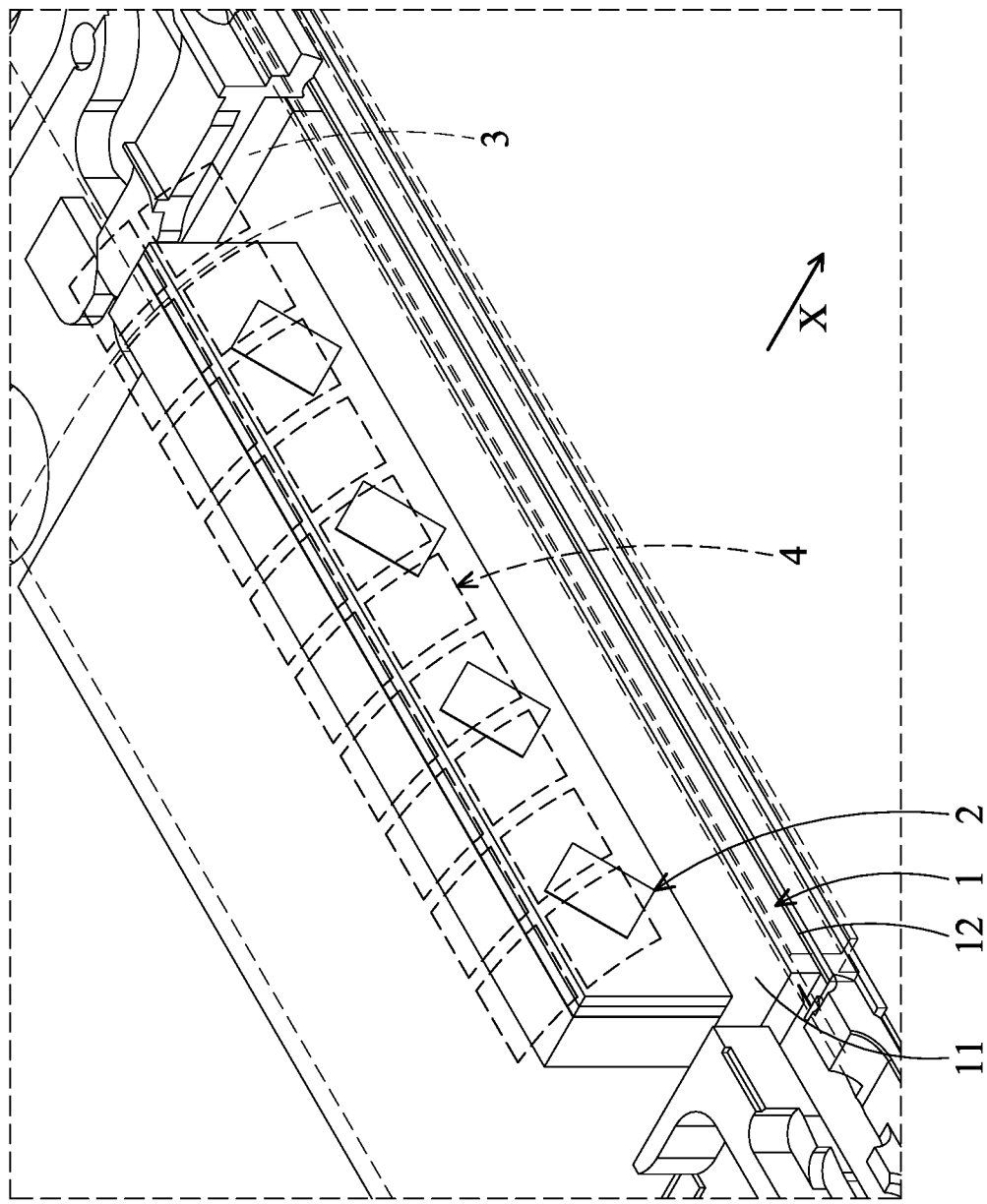
FIG. 1B is an enlarged view of portion 1B of FIG. 1A.

FIG. 1A is a perspective view of a portion of a wireless communication device of a first embodiment of the invention. FIG. 1B is an enlarged view of portion 1B of FIG. 1A. With reference to FIGS. 1A and 1B, the wireless communication device C includes a circuit board 1, an antenna module 2, a housing 3 and a metal pattern unit 4. The antenna module 2 is coupled to the circuit board 1.

In one embodiment, the antenna module 2 can be directly mounted on the circuit board 1. However, the disclosure is not meant to restrict the invention. For example, in another embodiment, the antenna module 2 can be coupled to the circuit board 1 via a flexible circuit board.

Figure 2A:
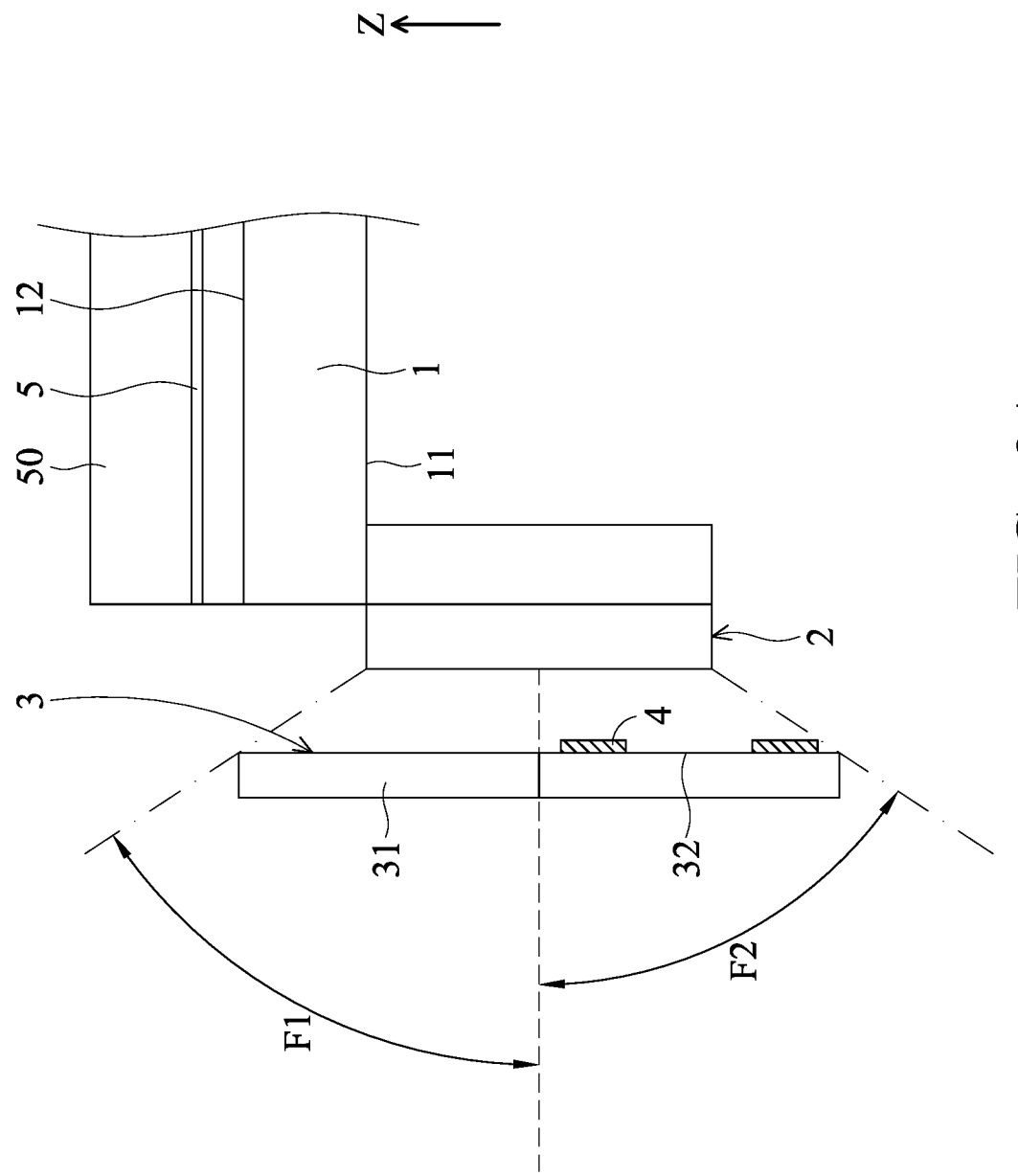
FIG. 2A is a side view of the antenna module of a second embodiment of the invention.
Figure 2B:
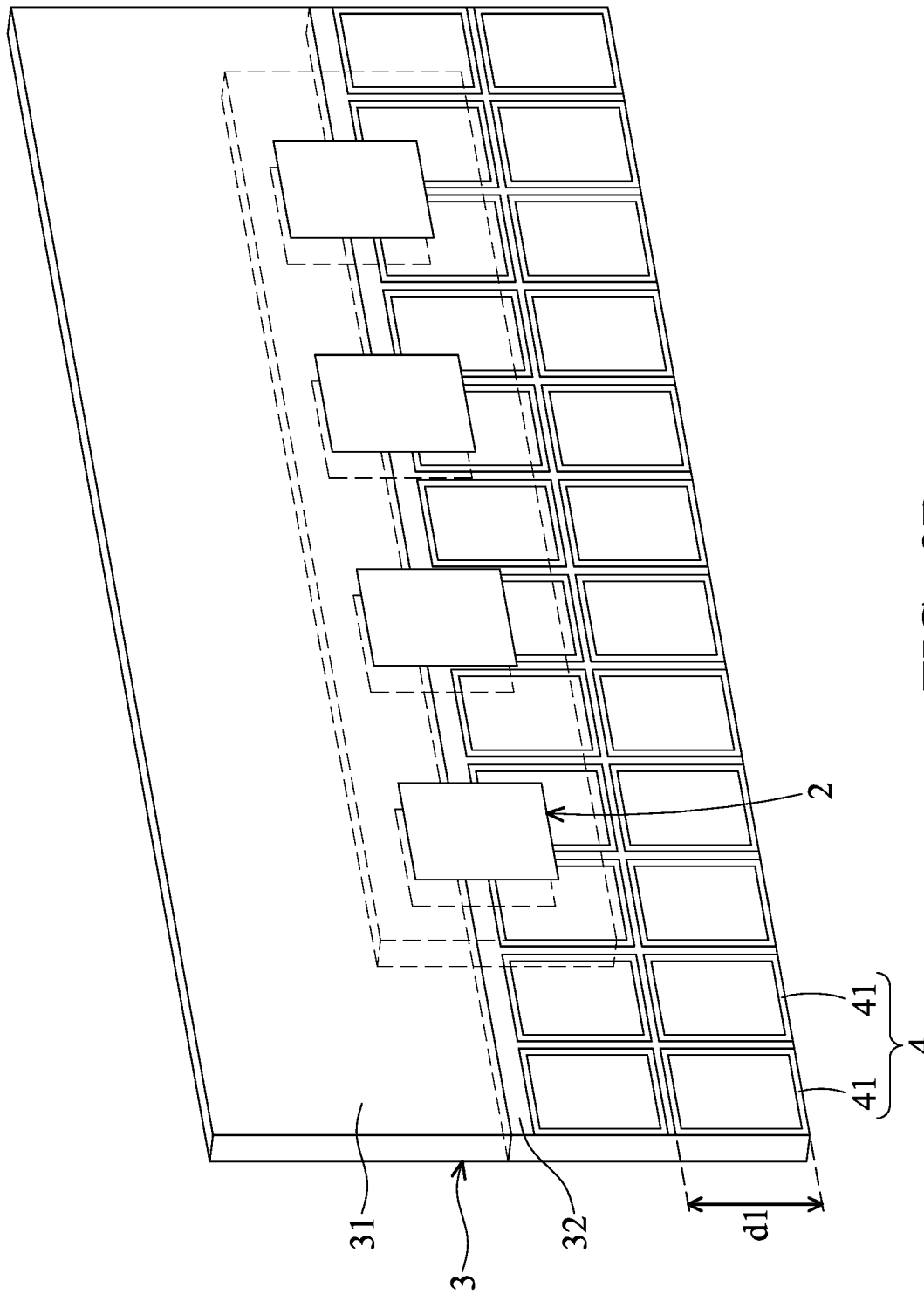
FIG. 2B is a perspective view of the antenna module of the second embodiment of the invention.

FIG. 2A is a side view of the antenna module of a second embodiment of the invention. FIG. 2B is a perspective view of the antenna module of the second embodiment of the invention. With reference to FIGS. 1B, 2A and 2B, in one embodiment, the antenna module 2 transmits a wireless signal. The antenna module 2 defines a first FOV area F1 and a second FOV area F2. The first FOV area F1 differs from the second FOV area F2. The housing 3 covers the antenna module 2. A lid portion 31 of the housing 3 corresponds to the first FOV area F1, and the lid portion 31 has a first equivalent dielectric constant. The metal pattern unit 4 corresponds to the second FOV area F2. The metal pattern unit 4 causes a second equivalent dielectric constant. The first equivalent dielectric constant differs from the second equivalent dielectric constant.

In one embodiment, the first FOV area F1 and the second FOV area F2 are defined according to the geometric center of the antenna module 2. The disclosure is not meant to restrict the invention.

With reference to FIG. 2B, in one embodiment, the metal pattern unit 4 comprises a plurality of metal strip patterns 41.

With reference to FIG. 2B, in one embodiment, the metal pattern unit 4 comprises a plurality of metal strip rectangle (metal strip patterns) 41, the wireless signal has a wavelength λ, and the length d of each of the metal strip rectangle 41 is less than $$\frac{\lambda}{2}.$$

Figure 3:
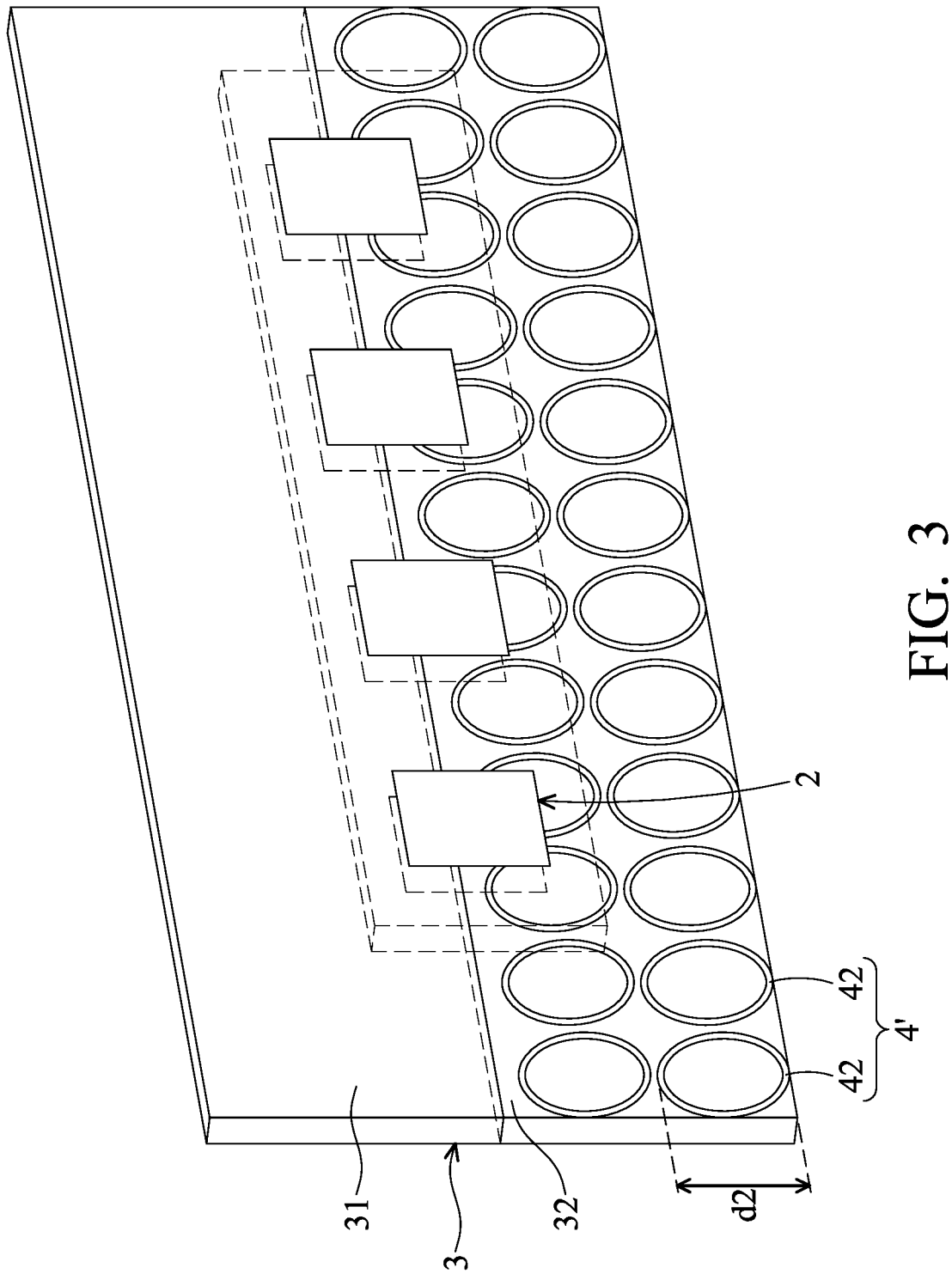
FIG. 3 is a perspective view of the antenna module of a third embodiment of the invention.

FIG. 3 is a perspective view of the antenna module of a third embodiment of the invention. With reference to FIG. 3, in this embodiment, the metal pattern unit 4' comprises a plurality of metal strip circles 42, the wireless signal has a wavelength λ, and the diameter d2 of each of the metal strip circle 42 is less than $$\frac{\lambda}{2}.$$

With reference to FIGS. 2B, in one embodiment, the metal strip patterns 41 are arranged in a matrix.

With reference to FIGS. 2A and 2B, in one embodiment, the metal pattern unit 4 is disposed on the inner surface 32 of the housing 3. However, the disclosure is not meant to restrict the invention. For example, in another embodiment, the metal pattern unit 4 can be embedded in the housing 3. The second equivalent dielectric constant is the equivalent dielectric constant of the combination of the metal pattern unit 4 and the housing 3 where the metal pattern unit 4 disposed on.

With reference to FIGS. 1A and 1B, in one embodiment, the wireless communication device C further comprises an electromagnetic shielding part. The electromagnetic shielding part can be a metal sheet, a screen, a riser card, a flexible circuit board or other elements. In this embodiment, the electromagnetic shielding part can be a metal sheet 5 or a screen 50. The antenna module 2 is disposed on the first surface 11 of the circuit board 1. The metal sheet 5 corresponds to the second surface 12 of the circuit board 1. The first surface 11 is opposite to the second surface 12. The antenna module 2 faces the lateral direction X of the wireless communication device C. In one embodiment, the lateral direction X is parallel to the circuit board 1.

With reference to FIG. 2A, in one embodiment, the lid portion 31 is located between the metal pattern unit 4 and the metal sheet 5 in a vertical direction Z. The first equivalent dielectric constant is greater than the second equivalent dielectric constant. In this embodiment, the vertical direction Z is perpendicular to the circuit board 1.

In the embodiments of the invention, the spherical coverage of the wireless signal of the antenna module 2 is deflected toward the area with higher equivalent dielectric constant. Therefore, the metal pattern unit 4 of the embodiment of the invention compensates the influence of the electromagnetic shielding part (the metal sheet 5 or the screen 50) and improves the signal transmission of the wireless communication device. In one embodiment, the spherical coverage of the wireless signal at the screen side of the wireless communication device can be increased from 36.7% to 42.5%. The disclosure is not meant to restrict the invention.

In the embodiment above, the metal pattern unit 4 of the embodiment of the invention is utilized to compensate the influence of the electromagnetic shielding part. However, the disclosure is not meant to restrict the invention. For example, in another embodiment, the metal pattern unit 4 can be utilized to deflect the spherical coverage of the wireless signal of the antenna module 2 away from the user and to reduce the electromagnetic waves absorbed by the user.

Figure 4:
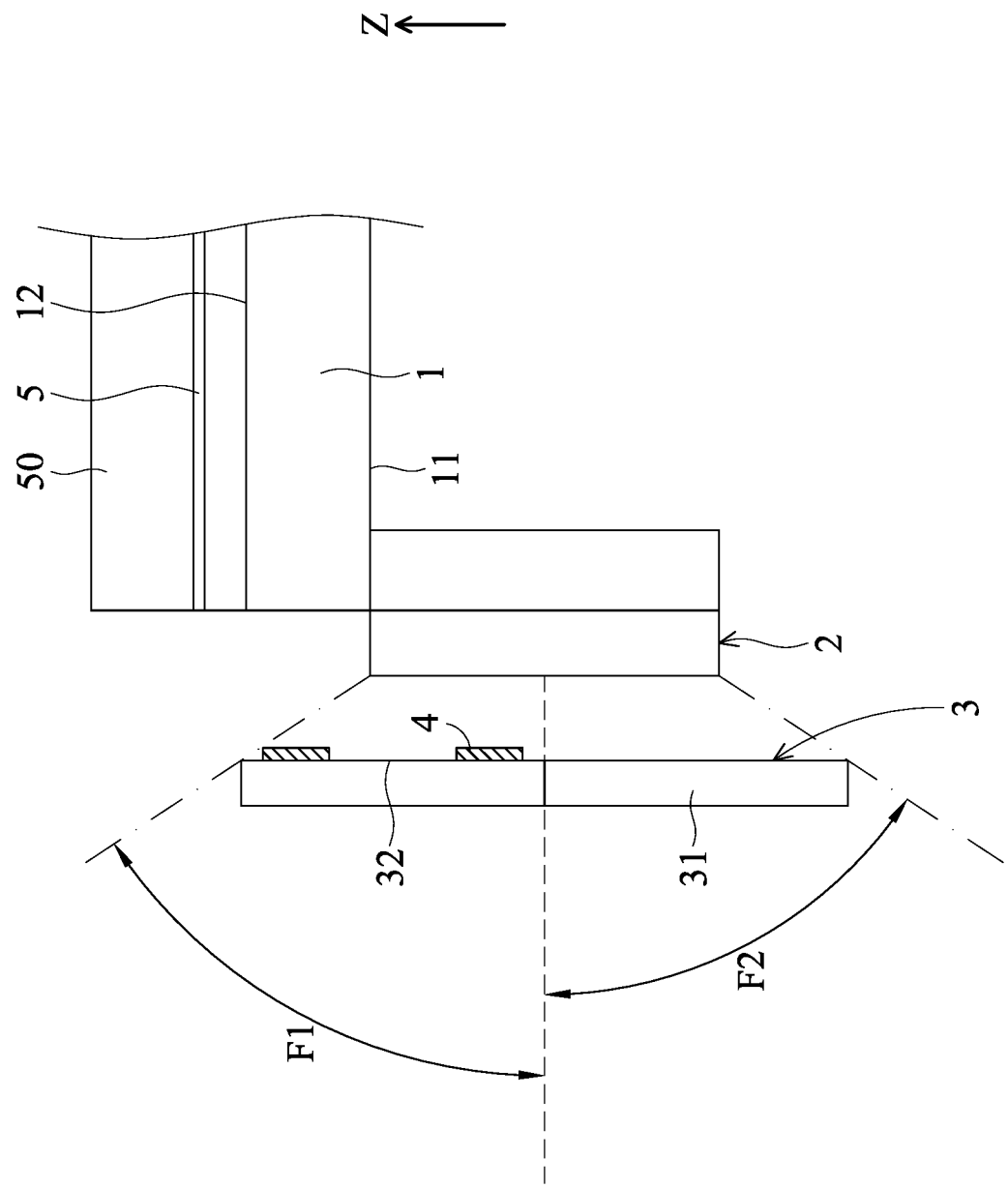
FIG. 4 is a side view of the antenna module of a fourth embodiment of the invention.

FIG. 4 is a side view of the antenna module of a fourth embodiment of the invention. With reference to FIG. 4, in this embodiment, the metal pattern unit 4 is located between the lid portion 31 and the metal sheet 5 in the vertical direction Z. the second equivalent dielectric constant is greater than the first equivalent dielectric constant.

With reference to FIG. 4, in one embodiment, the metal sheet 5 is a portion of a screen 50. The disclosure is not meant to restrict the invention.

Figure 5:
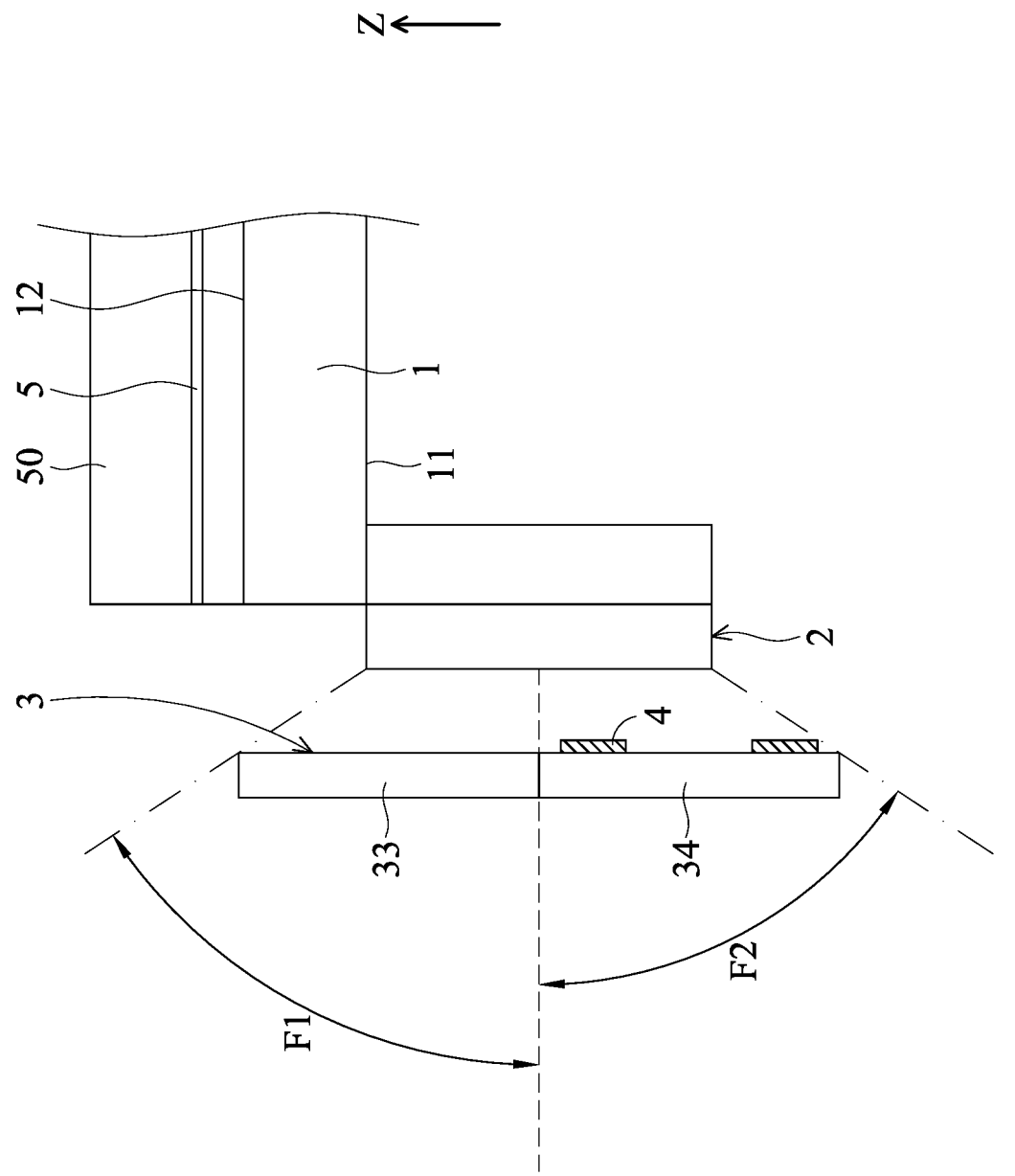
FIG. 5 is a side view of the antenna module of a fifth embodiment of the invention.

FIG. 5 is a side view of the antenna module of a fifth embodiment of the invention. With reference to FIG. 5, in one embodiment, the housing 3 covers the antenna module 2. A first lid portion 33 of the housing 3 corresponds to the first FOV area F1. A second lid portion 34 of the housing 3 responds to the second FOV area F2. The first lid portion 33 has a first equivalent dielectric constant. The second lid portion 34 has a second equivalent dielectric constant. The first equivalent dielectric constant differs from the second equivalent dielectric constant. In one embodiment, the difference between the first equivalent dielectric constant and the second equivalent dielectric constant is caused by the metal pattern unit 4. However, the disclosure is not meant to restrict the invention. For example, in another embodiment, the first lid portion 33 is made of a first material, and the second lid portion 34 is made of a second material. The first material differs from the second material.

In the embodiments of the invention, the size of the first FOV area F1 can be equal to the size of the second FOV area F2. However, the disclosure is not meant to restrict the invention. In other embodiments, the size of the first FOV area F1 can be greater than the size of the second FOV area F2, or the size of the first FOV area F1 can be smaller than the size of the second FOV area F2.

With reference to FIG. 5, in one embodiment, the first lid portion 33 is located between the second lid portion 34 and the metal sheet 5 in the vertical direction Z. The first equivalent dielectric constant is greater than the second equivalent dielectric constant. In this embodiment, the second lid portion 34 comprises a metal pattern unit 4, and the first lid portion 33 has no metal pattern unit.

Figure 6:
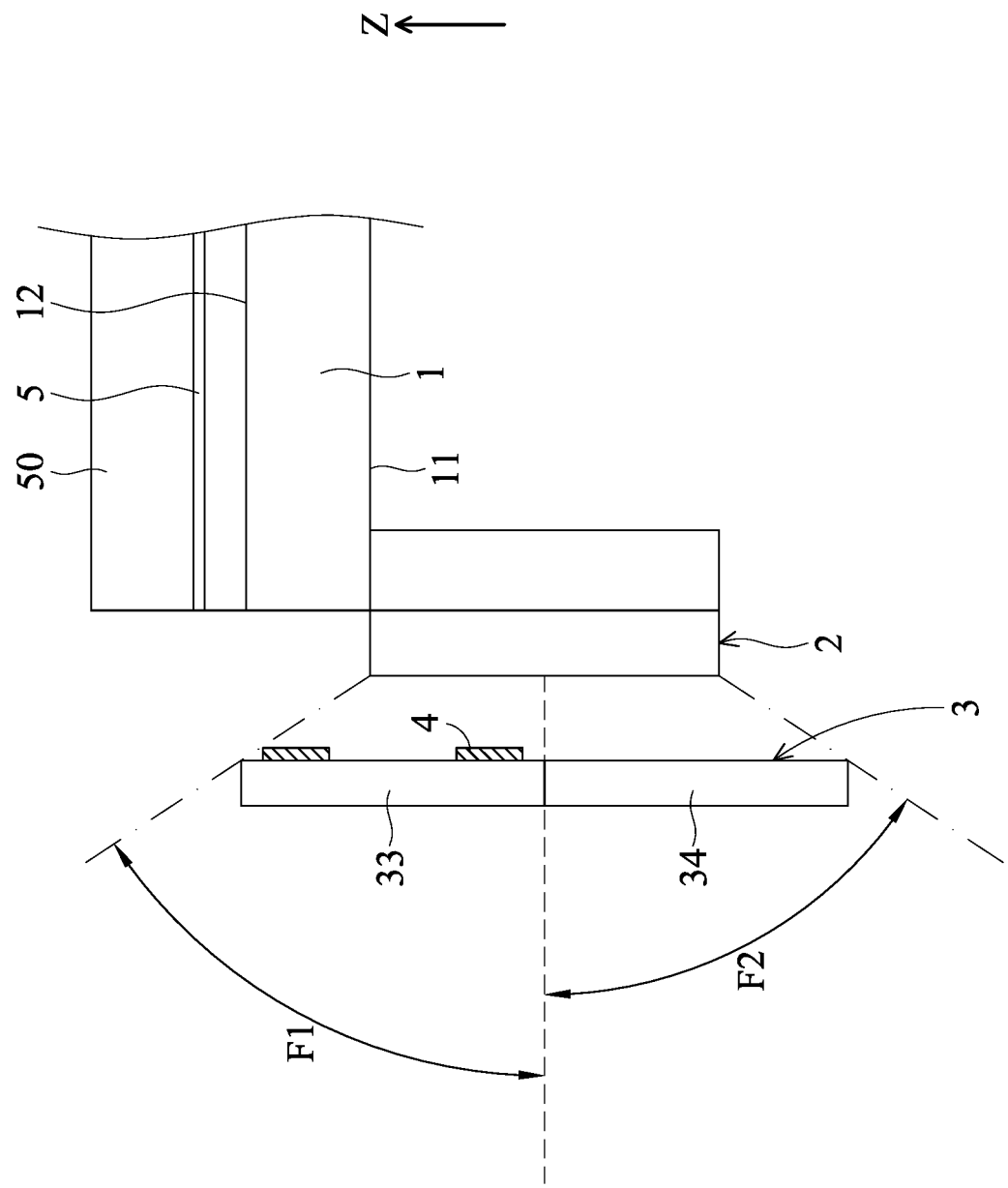
FIG. 6 is a side view of the antenna module of a sixth embodiment of the invention.

FIG. 6 is a side view of the antenna module of a sixth embodiment of the invention. With reference to FIG. 6, in this embodiment, the first lid portion 33 comprises a metal pattern unit 4, and the second lid portion 34 has no metal pattern unit. In the embodiments of the invention, the metal pattern unit 4 can be utilized to increase or decrease the equivalent dielectric constant. The disclosure is not meant to restrict the invention.

Figure 7:
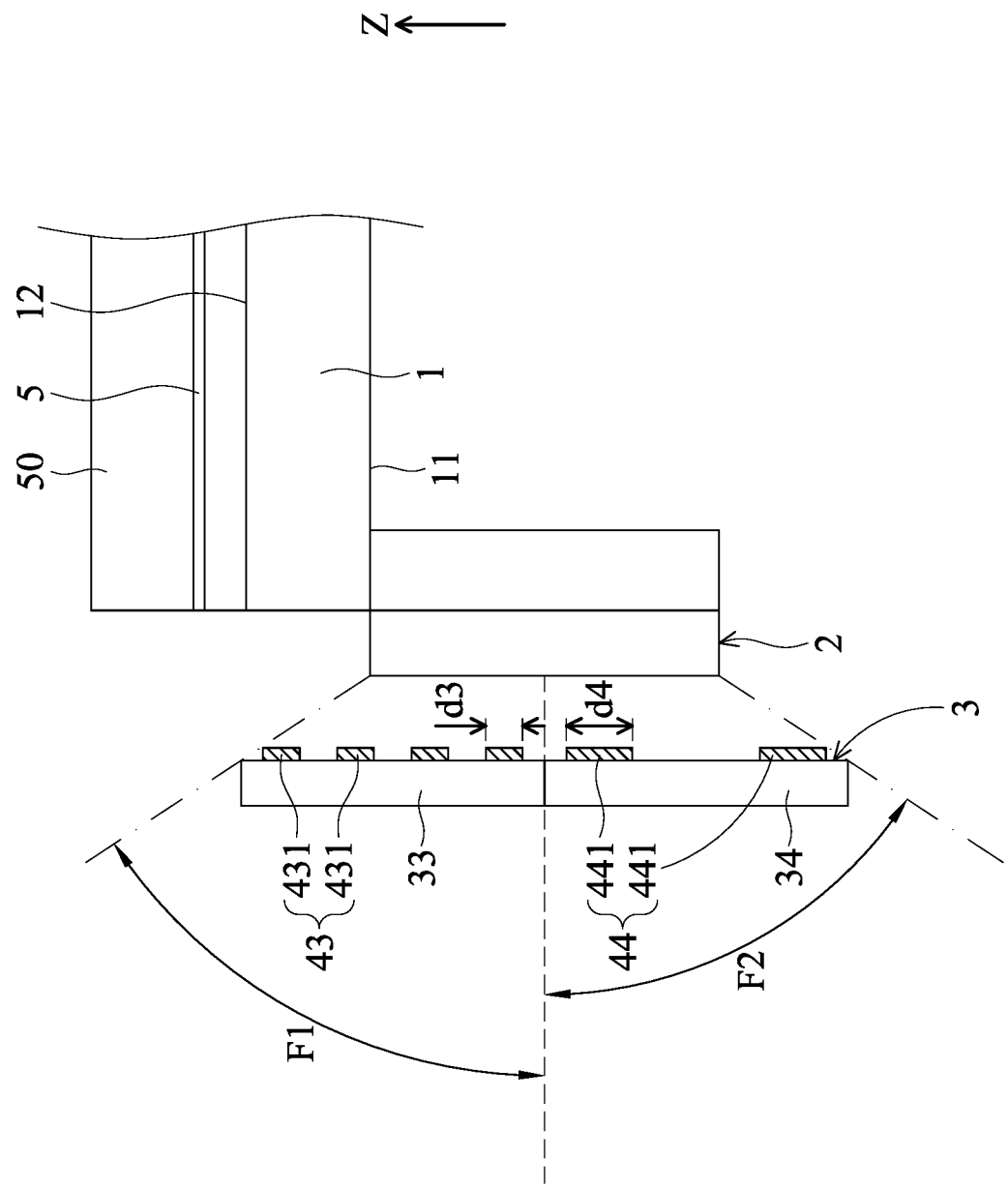
FIG. 7 is a side view of the antenna module of a seventh embodiment of the invention.

FIG. 7 is a side view of the antenna module of a seventh embodiment of the invention. With reference to FIG. 7, in this embodiment, the first lid portion 33 comprises a first metal pattern unit 43, and the second lid portion 34 comprises a second metal pattern unit 44. In this embodiment, the first metal pattern unit 43 comprises a plurality of first metal strip rectangles 431. The second metal pattern unit 44 comprises a plurality of second metal strip rectangles 441. The length d3 of each of the first metal strip rectangles 431 differs from the length d4 of each of the second metal strip rectangles 441.

With reference to FIGS. 5, 6 and 7, one embodiment, the first lid portion 33 and the second lid portion 34 can be flat portions or curved portions. The disclosure is not meant to restrict the invention.

Figure 8:
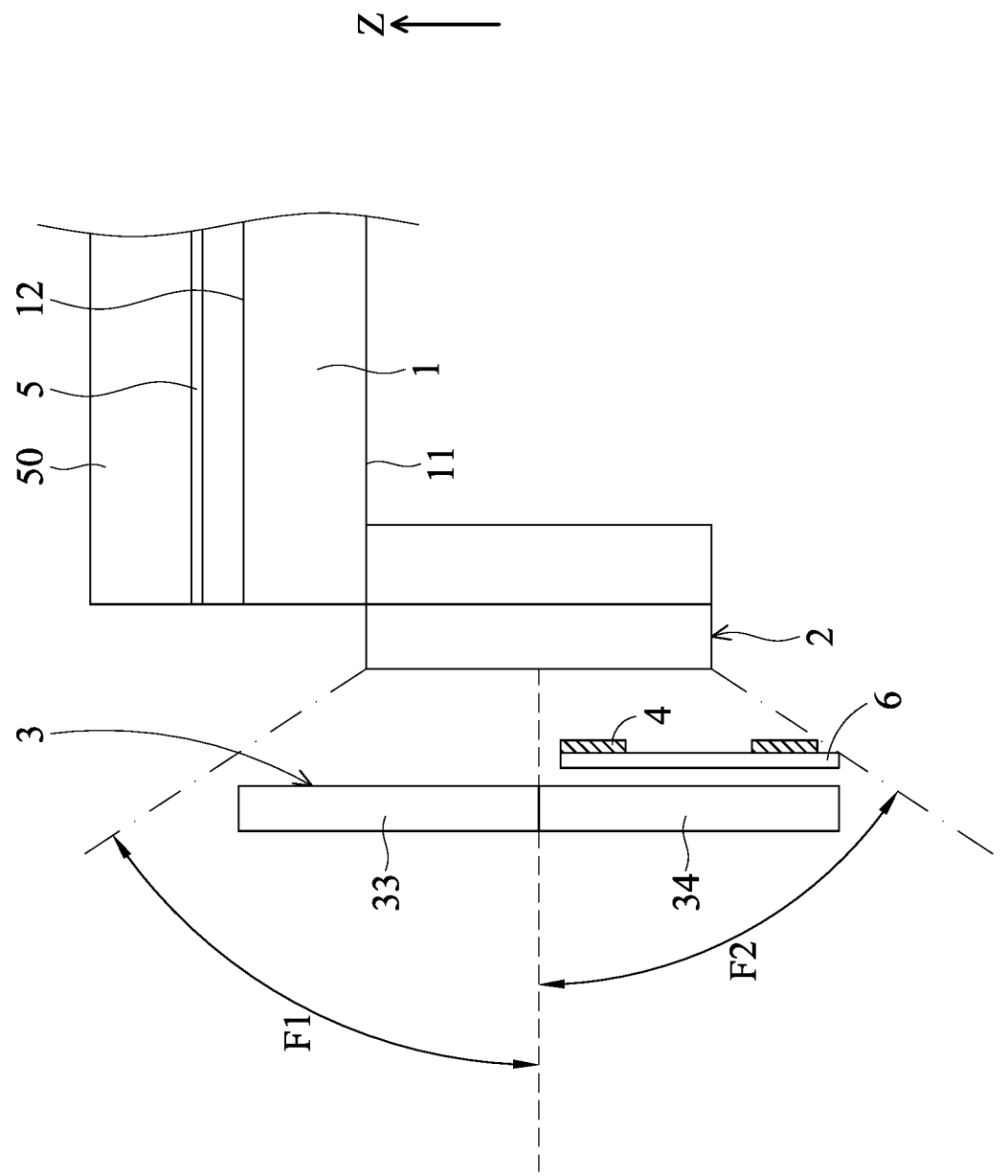
FIG. 8 is a side view of the antenna module of an eighth embodiment of the invention.

In the embodiments above, the metal pattern unit 4 is disposed on the housing. However, the disclosure is not meant to restrict the invention. FIG. 8 is a side view of the antenna module of an eighth embodiment of the invention. With reference to FIG. 8, in one embodiment, the wireless communication device further comprises a substrate 6. The substrate 6 is disposed between the antenna module 2 and the housing 3. The metal pattern unit 4 is disposed on the substrate 6.

In the embodiments above, the antenna module 2 is perpendicular to the circuit board 1. However, the disclosure is not meant to restrict the invention. For example, in one embodiment, the antenna module 2 can be parallel to the circuit board 1.

Figure 9:
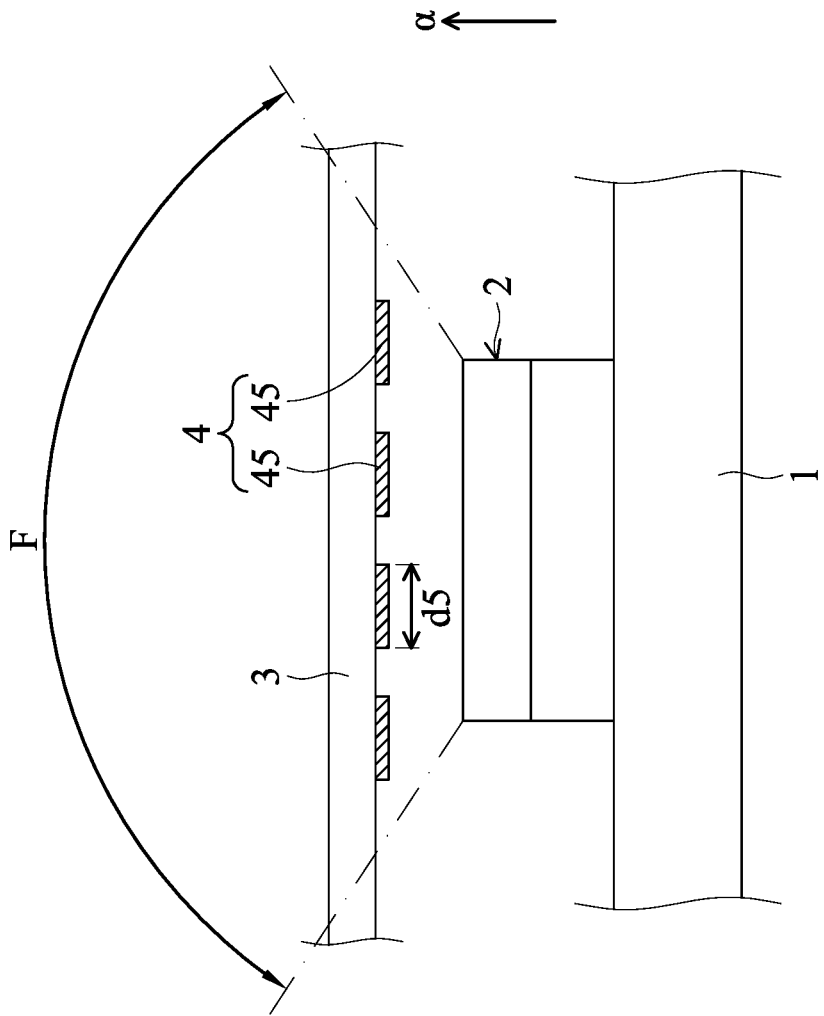
FIG. 9 is a side view of a portion of a wireless communication device of a ninth embodiment of the invention.

FIG. 9 is a side view of a portion of a wireless communication device of a ninth embodiment of the invention. With reference to FIG. 9, in this embodiment, a wireless communication device C9 is provided. The wireless communication device C9 includes a circuit board 1, an antenna module 2, a housing 3 and a metal pattern unit 4. The antenna module 2 is coupled to the circuit board 1. The antenna module 2 transmits a wireless signal. The antenna module 2 defines a FOV area F. The housing 3 covers the antenna module 2. The metal pattern unit 4 is disposed on the housing 3. The metal pattern unit 4 corresponds to the FOV area and an equivalent dielectric constant of the housing 3 is decreased by the metal pattern unit 4.

With reference to FIG. 9, in one embodiment, the antenna module 2 faces a direction that is a perpendicular to the circuit board 1. The metal pattern unit 4 comprises a plurality of metal strip rectangles 45. The wireless signal has a wavelength $\lambda$, and the length d5 of each of the metal strip rectangles 45 is less than $$\frac{\lambda}{2}.$$

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless communication device, comprising:
a circuit board;
an antenna module, coupled to the circuit board, wherein the antenna module transmits a wireless signal, the antenna module defines a first field of view (FOV) area and a second FOV area, and the first FOV area differs from the second FOV area;
a housing, covering the antenna module, wherein a lid portion of the housing corresponds to the first FOV area, and the lid portion has a first equivalent dielectric constant; and
a metal pattern unit, wherein the metal pattern unit corresponds to the second FOV area, the metal pattern unit causes a second equivalent dielectric constant, and the first equivalent dielectric constant differs from the second equivalent dielectric constant.

2. The wireless communication device as claimed in claim 1, wherein the metal pattern unit comprises a plurality of metal strip patterns.

3. The wireless communication device as claimed in claim 2, wherein the metal pattern unit comprises a plurality of metal strip rectangles, the wireless signal has a wavelength $\lambda$, and a length of each of the metal strip rectangles is less than $$\frac{\lambda}{2}.$$

4. The wireless communication device as claimed in claim 2, wherein the metal pattern unit comprises a plurality of metal strip circles, the wireless signal has a wavelength $\lambda$, and a diameter of each of the metal strip circles is less than $$\frac{\lambda}{2}.$$

5. The wireless communication device as claimed in claim 2, wherein the metal strip patterns are arranged in a matrix.

6. The wireless communication device as claimed in claim 2, wherein the metal pattern unit is disposed on an inner surface of the housing.

7. The wireless communication device as claimed in claim 2, further comprising an electromagnetic shielding part, wherein the antenna module is disposed on a first surface of the circuit board, the electromagnetic shielding part corresponds to a second surface of the circuit board, the first surface is opposite to the second surface, and the antenna module faces a lateral direction of the wireless communication device.

8. The wireless communication device as claimed in claim 7, wherein the lid portion is located between the metal pattern unit and the electromagnetic shielding part, and the first equivalent dielectric constant is greater than the second equivalent dielectric constant.

9. The wireless communication device as claimed in claim 8, wherein the metal pattern unit is located between the lid portion and the electromagnetic shielding part, and the second equivalent dielectric constant is greater than the first equivalent dielectric constant.

10. The wireless communication device as claimed in claim 2, further comprising a screen, wherein the antenna module is disposed on the first surface of the circuit board, the screen corresponds to the second surface of the circuit board, the first surface is opposite to the second surface, and the antenna module faces the lateral direction of the wireless communication device.

11. The wireless communication device as claimed in claim 2, further comprising a substrate, wherein the substrate is disposed between the antenna module and the housing, and the metal pattern unit is disposed on the substrate.

12. A wireless communication device, comprising:
a circuit board;
an antenna module, coupled to the circuit board, wherein the antenna module transmits a wireless signal, the antenna module defines a first field of view (FOV) area and a second FOV area, and the first FOV area differs from the second FOV area;
a housing, covering the antenna module, wherein a first lid portion of the housing corresponds to the first FOV area, a second lid portion of the housing corresponds to the second FOV area, the first lid portion has a first equivalent dielectric constant, the second lid portion has a second equivalent dielectric constant, and the first equivalent dielectric constant differs from the second equivalent dielectric constant.

13. The wireless communication device as claimed in claim 12, further comprising an electromagnetic shielding part, wherein the antenna module is disposed on the first surface of the circuit board, the electromagnetic shielding part corresponds to the second surface of the circuit board, the first surface is opposite to the second surface, and the antenna module faces the lateral direction of the wireless communication device.

14. The wireless communication device as claimed in claim 13, wherein the first lid portion is located between the second lid portion and the electromagnetic shielding part, and the first equivalent dielectric constant is greater than the second equivalent dielectric constant.

15. The wireless communication device as claimed in claim 14, wherein the first lid portion comprises a metal pattern unit, and the second lid portion has no metal pattern unit.

16. The wireless communication device as claimed in claim 14, wherein the second lid portion comprises a metal pattern unit, and the first lid portion has no metal pattern unit.

17. The wireless communication device as claimed in claim 14, wherein the first lid portion comprises a first metal pattern unit, and the second lid portion comprises a second metal pattern unit.

18. The wireless communication device as claimed in claim 17, wherein the first metal pattern unit comprises a plurality of first metal strip rectangles, the second metal pattern unit comprises a plurality of second metal strip rectangles, and a length of each of the first metal strip rectangles differs from a length of each of the second metal strip rectangles.

19. The wireless communication device as claimed in claim 13, wherein the first lid portion and the second lid portion are curved.

20. A wireless communication device, comprising:
a circuit board;
an antenna module, coupled to the circuit board, wherein the antenna module transmits a wireless signal, and the antenna module defines a field of view (FOV) area;
a housing, covering the antenna module;
a metal pattern unit, disposed on the housing, wherein the metal pattern unit corresponds to the FOV area and an equivalent dielectric constant of the housing is decreased by the metal pattern unit.

21. The wireless communication device as claimed in claim 20, wherein the antenna module faces a direction perpendicular to the circuit board, the metal pattern unit comprises a plurality of metal strip rectangles, the wireless signal has a wavelength $\lambda$, and the length of each of the metal strip rectangles is less than $$\frac{\lambda}{2}.$$

* * * * *